April 17, 1962        E. G. HILL        3,030,154
BRAKE OPERATING MECHANISM
Filed July 15, 1959        2 Sheets-Sheet 2
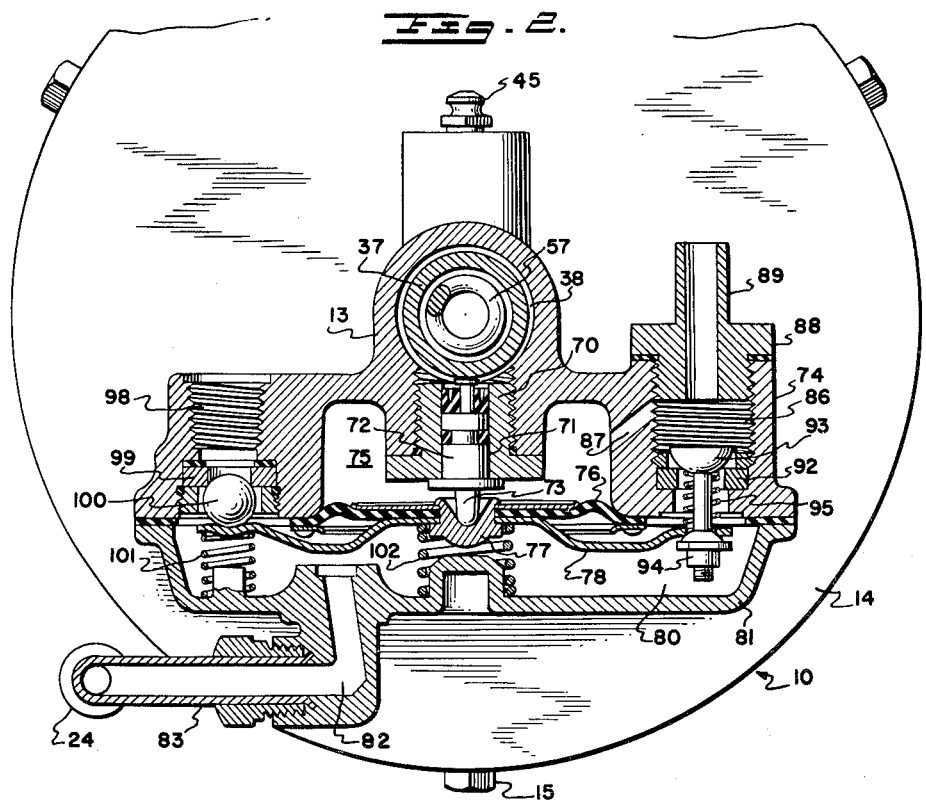
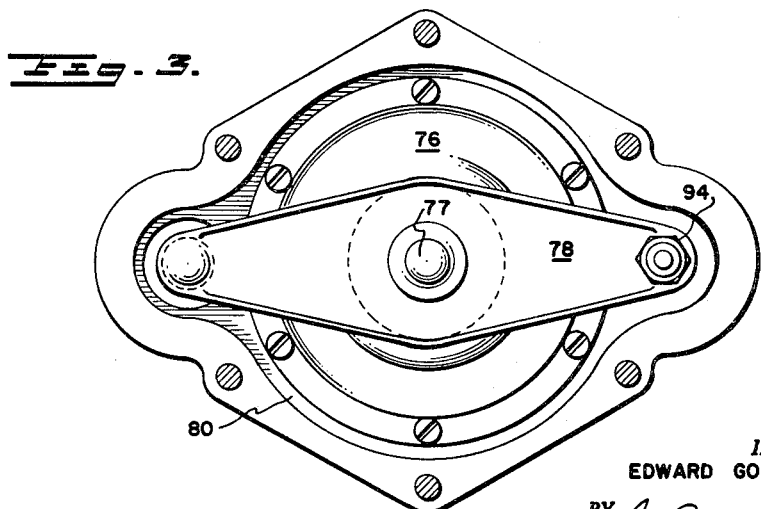
INVENTOR.
EDWARD GOVAN HILL
BY *John F. Phillips*
ATTORNEY though, that the present apparatus differs from that shown in the copending application in a manner which will be described.

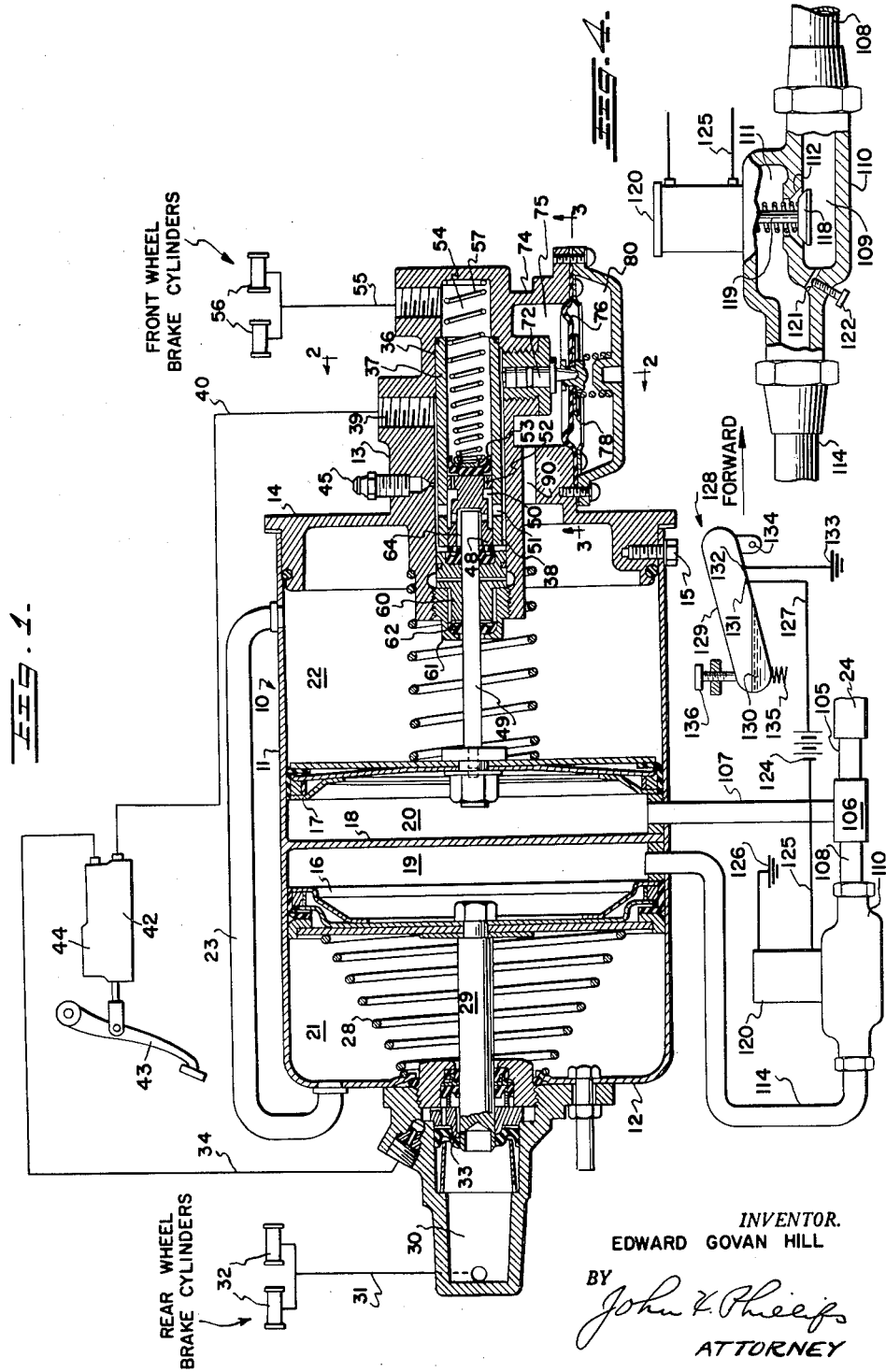

United States Patent Office
3,030,154
Patented Apr. 17, 1962

3,030,154
BRAKE OPERATING MECHANISM
Edward Govan Hill, Birmingham, Mich., assignor to Kelsey-Hayes Company, Detroit, Mich., a corporation of Delaware
Filed July 15, 1959, Ser. No. 827,193
6 Claims. (Cl. 303—6)

This invention relates to a brake operating mechanism and is a continuation-in-part of my application Serial No. 523,309, filed July 20, 1955, now abandoned. The invention is an improvement over the structure shown in the copending application of David T. Ayers, Jr., and Edward Govan Hill, Serial No. 474,804, filed December 13, 1954, and over that shown in my Patent No. 2,876,044, granted March 3, 1959.

In the copending application Serial No. 474,804, referred to above, there is disclosed a booster brake mechanism having dual motor units each operating its own master cylinder plunger, and each plunger operates to displace fluid into one set of wheel cylinders. As disclosed in such application, the plunger for displacing fluid into the front wheel brake cylinders, in the case of a passenger car, is assisted by pedal generated forces and such forces are used simultaneously to operate a single follow-up valve mechanism for controlling both motor units. The motor unit for applying the rear brakes of the vehicle is not pedal-assisted, and accordingly all pressures generated in the rear brake cylinders depend upon the degree of energization of the rear brake motor unit.

A system of the foregoing character has been found to be highly important since heavy pedal pressures do not assist the rear brake applying motor and accordingly such motor, under normal braking conditions on average roads will not lock and slide the rear wheels. At the same time, all pedal generated pressures, other than that which is required for the operation of the follow-up valve mechanism, are delivered to the master cylinder plunger which generates pressure in the front wheel brake cylinders. In other words, where pedal generated forces normally would be divided between front and rear wheel brake cylinders, none are applied to the rear brakes and substantially all are applied to the front brakes, thus providing for very heavy front brake application which is possible without sliding the front wheels of a passenger vehicle. Thus heavier maximum braking is provided with a given pedal effort for the front wheels while sliding of the rear wheels is minimized. Accordingly, the total braking effort is highly efficient and, in practice, it has been found that vehicle deceleration may be increased as much as twenty percent by maintaining traction of the rear wheels on the road.

As stated, the system just discussed minimizes the locking and sliding of the rear wheels. However, in order to obtain maximum rear wheel braking under normal conditions, the degree of motor generated forces which can be delivered to the rear wheel cylinders is excessive in the case of a so-called "panic" stop, there being a tendency upon the sudden maximum application of rear brake forces to lock and slide the rear wheels. This tendency, under normal braking conditions, is reduced by the fact that a single follow-up valve mechanism controls the energization of both motors simultaneously and thus positively prevents even the slightest degree of rear brake motor energization ahead of front brake motor energization. This in itself, however, will not prevent locking and sliding of the rear wheels in the event of an emergency stop.

In my Patent No. 2,876,044, referred to above, there is disclosed an apparatus in which further increased efficiency in brake application is provided in a system of the character referred to. The structure in the patent just identified provides an inertia valve in the form of a ball spring-pressed to normal open position and arranged in a duct between the follow-up valve mechanism and the rear brake motor. So long as the ball valve is open, the rear brake motor is fully under the control of the follow-up valve mechanism. In the event vehicle deceleration takes place above a predetermined rate, as in an emergency stop, the inertia of the ball valve causes it to close against its biasing means before the rear brake motor is fully energized, to prevent further energization of such motor, thereby in most instances preventing the rear wheels from locking and sliding. While an inertia valve of the type mentioned greatly improves the general system discussed above, it leaves something to be desired since the inertia of the ball acts solely against the biasing spring and thus does not take into account differences in the loading of the vehicle and inclines along which the vehicle is traveling.

An important object of the present invention is to provide a brake mechanism of the character generally referred to which takes into account variations in the loading of the vehicle and differences in grades over which a vehicle is traveling to prevent the locking and sliding of the rear wheels in a system in which a motor alone provides the power for applying the rear brakes, thus tending under varying conditions to prevent the locking and sliding of the rear wheels.

A further object is to provide a system of this kind wherein varying vehicle weights and road grades are taken into account, but wherein operation of the front wheel brake cylinder is not affected by the functioning of the means for controlling the application of the rear brakes so that, regardless of the functioning of such means, the "feel" or reaction transmitted to the brake pedal in the type of system referred to is unaffected.

A further object is to provide a system of this sort wherein an inertia responsive valve in the fluid line to the rear brake cylinders is controlled by a mercury switch inclined upwardly and forwardly of the vehicle, such switch having been found to be highly sensitive to changes in the loading of the vehicle and to changes in its inclination whereby the inertia responsive valve will function under average conditions to limit energization of the rear brake motor at predetermined degrees of vehicle deceleration, but will automatically operate at increased or decreased rates of vehicle deceleration above or below said predetermined rate in accordance with differences in the loading of the vehicle and differences in road grades, which will change the inclination to the horizontal of the mercury switch.

Other objects and advantages of the invention will become apparent during the course of the following description.

In the drawings I have shown one embodiment of the invention. In this showing:

FIGURE 1 is a longitudinal sectional view through a booster mechanism for a vehicle braking system, the conventional master cylinder, the wheel cylinders and the mercury controlled switch being diagrammatically illustrated;

FIGURE 2 is an enlarged sectional view on line 2—2 of FIGURE 1;

FIGURE 3 is a similar view on line 3—3 of FIGURE 1; and

FIGURE 4 is a detail sectional view, parts being shown in elevation, illustrating the solenoid controlled valve.

Referring to the drawings, it will be noted that the apparatus discloses a single motor unit for applying the front and rear brakes as disclosed in the copending application referred to above. It will become apparent, however, that separate motors may be employed for operating the front and rear brake cylinders.

In FIGURE 1, the single motor unit is designated as a whole by the numeral 10 and comprises a cylinder 11 having one end closed as at 12. The other end of the motor is provided with a preferably die-cast body 13 having a motor head portion 14 connected to the end of the cylinder 11 as at 15.

The motor cylinder 11 is provided therein with a pair of oppositely movable pistons 16 and 17, and a dividing wall 18 therebetween forms with the pistons a pair of variable presure chambers 19 and 20. A constant pressure chamber 21 is formed between the piston 16 and head 12, and the piston 17 and head 14 define therebetween a similar constant pressure chamber 22. The chambers 21 and 22 are connected by a jumper line 23 and, accordingly, pressures are always equalized in these chambers.

A valve mechanism forming no part per se of the present invention controls the pressures in the chambers 19 and 20 through a main conduit 24 which branches for communication with the chambers 19 and 20 in a manner to be described. In the preferred embodiment of the invention, all of the motor chambers are normally connected to a source of vacuum by the valve mechanism, and accordingly the motor is normally completely vacuum suspended. Under such conditions, the parts will occupy the inoperative positions shown in FIGURE 1. When the valve mechanism operates to admit air into the chambers 19 and 20, the pistons 16 and 17 will be moved away from each other, as will be apparent.

The piston 16 is biased to its off position by a return spring 28, and the piston is connected to a plunger 29 movable into a hydraulic chamber 30 to displace fluid through conventional lines 31 to the rear brake cylinders 32 of the motor vehicle. The plunger 29 slides in suitable bearing and sealing means indicated as a whole by the numeral 33, forming no part of the present invention. The bearing and sealing means provide for the admission of replenishing fluid into the hydraulic chamber 30 through a line 34, as will become more apparent below.

The die-cast body 13 is provided with a bore 36 carrying therein a sleeve 37 surrounded between its ends by an annular space 38. Such space communicates through an inlet opening 39 with a hydraulic fluid line 40 leading to a conventional master cylinder 42 operated in the usual manner by a pedal 43. The usual master cylinder piston (not shown) displaces fluid through the line 40 upon operation of the pedal 43. A reservoir 44 of the usual type is provided for the master cylinder and is in fixed communication with the line 34 to supply replenishing fluid to the chamber 30 when needed.

The sleeve 37 defines a hydraulic cylinder in which is operable a fluid displacing plunger 48 adapted to be actuated by a piston rod 49 connected to the piston 17. Around the plunger 48 is an annular space 50 communicating through a port 51 with the annular space 38. Fluid from the master cylinder accordingly flows into the space 50 and thence around the lip of a cup 53 carried by the free end of the plunger 48. Such fluid flows into a hydraulic chamber 54 and thence through lines 55 into the front wheel brake cylinders 56. Such flow of fluid takes place upon initial operation of the brake pedal 43, as will become apparent below. The plunger 48 is biased to the normal off position in FIGURE 1 by a spring 57.

The piston rod 49 extends through a bearing 60 mounted in the inner end of the body 13. This bearing is maintained in position by a nut 61 having a fluid seal 62 therein. The piston rod 49 extends into a recess 64 in the back end of the plunger 48, and this recess is open to communication with the space 50 whereby fluid pressure in the recess 64, generated by the pedal 43, assists the motor piston 17 in moving the plunger 48 to displace fluid from the chamber 54 into the front wheel brake lines.

The control valve mechanism for the motor means forms per se no part of the present invention, and any suitable mechanism may be employed for this purpose. The valve mechanism shown is described and claimed in the copending application of Jeannot G. Ingres, Serial No. 455,647, filed September 13, 1954, now Patent No. 2,905,151, granted September 22, 1959.

Referring to FIGURE 2 it will be noted that a nut 70 is threaded into the body 13 and forms a cylinder 71 in which is arranged a sealed plunger 72. The upper end of the cylinder 71 communicates with the space 38 and accordingly pressures generated in such space will move the plunger 72 downward as viewed in FIGURE 2. An operating boss 73 is carried by the lower end of the plunger 72.

An integral depending annular portion 74 is formed on the body 13 and defines therein a vacuum chamber 75 sealed at the bottom by a diaphragm 76. Such diaphragm carries a thimble 77 axially recessed at the top thereof to receive the boss 73. The thimble 77 is fixed with respect to the diaphragm 76 and also with respect to a lever 78 centrally of the length thereof. This lever is arranged in a control chamber 80 formed in a closure cap 81 secured to the bottom of the annular portion 74. The chamber 80 communicates through passage 82 and elbow 83 with the conduit 24 referred to above.

The body 13 is provided radially outwardly of the chamber 75 with a vacuum chamber 86 communicating at all times with the chamber 75 through a port 87, thus maintaining vacuum conditions at all times in the chamber 75. A fitting 88, threaded into the upper end of the chamber 86, has an upstanding nipple 89 adapted to communicate through a suitable conduit (not shown) with a source of suitable operating vacuum. The vacuum chamber 75 is in fixed communication with the motor chamber 22 through a passage 90 (FIGURE 1).

The vacuum chamber 86 is provided in the bottom thereof with a valve seat 92 engageable by a hemispherical valve 93 the depending stem of which is provided with a nut 94 engaging against the bottom of one end of the lever 78. A small spring 95 maintains the valve 93 at its upper limit of movement with the nut 94 engaging the lever 78. The valve 93 is normally open as in FIGURE 2, the chambers 80 and 86 thus normally communicating with each other to exhaust air through the pipe line 24 to maintain vacuum in the chambers 19 and 20.

At a point diametrically opposite the vacuum chamber 86, the body 13 has an air inlet 98 tapped for connection with a suitable air cleaner (not shown). A valve seat 99 in the bottom of the air inlet 98 is normally engaged by a ball valve 100 as shown in FIGURE 2. This ball valve engages the top of the adjacent end of the lever 78 and such end of the lever is urged upwardly by a spring 101. A compression spring 102 urges the center of the lever 78 upwardly.

The conduit 24 (FIGURE 1) has its end remote from the valve mechanism connected to a pipe 105 having a T 106 a branch of which is connected by a pipe 107 to the motor chamber 20. The run of the T 106 communicates through a pipe 108 with a chamber 109 (FIGURE 4) formed in the bottom of a valve housing 110. This valve housing has an upper chamber 111 normally communicating through a valve seat 112 with the chamber 109, and the chamber 111 communicates through a conduit 114 with the motor chamber 19.

A valve 118 controls communication between the chambers 109 and 111 and is normally open as shown in FIGURE 4. This valve has its stem 119 connected to or forming a part of the armature of a solenoid 120 which, when energized, seats the valve 118 to disconnect the chambers 109 and 111 from each other so far as the valve seat 112 is concerned. A small bleed opening 121 may provide very restricted communication between the valve chamber 109 and 111 when the valve 118 is closed. The bleed 121 may be adjusted by a screw 122.

The solenoid 120 is adapted to be energized by the conventional vehicle battery 124 (FIGURE 1) shown for convenience as being connected by a wire 125 to one terminal of the solenoid 120. The other terminal of this solenoid is grounded as at 126. The other battery terminal is connected to one end of a wire 127 leading to a mercury switch indicated as a whole by the numeral 128. The mercury switch comprises a tube 129, extending longitudinally of the vehicle, sloping upwardly and forwardly of the vehicle and provided therein with a body of mercury 130 the level of which is rearwardly of and below a pair of contacts 131 and 132, the former of which is connected to the wire 127. The contact 132 is grounded as at 133. The inertia of the mercury 130, under predetermined vehicle decelerating conditions further referred to below, will cause the mercury to flow uphill toward the front of the vehicle to close a circuit across the contacts 131 and 132. One end of the tube 129 may be pivotally supported as at 134. At the other end of the tube a spring 135 biases the tube upwardly into engagement with an adjusting screw 136 which may be turned to adjust the upward and forward inclination of the tube 129. Any suitable adjusting means may be employed for this purpose, preferably accessible from the driver's seat of the vehicle.

Operation

The operation of the apparatus is as follows. The parts normally occupy the positions shown in the drawings. The follow-up valve mechanism is fully described in the copending applications referred to, and the operation of such valve mechanism need not be described in detail. The vacuum valve 93 (FIGURE 2) is normally open and the air valve 100 is normally closed, as shown. Accordingly, vacuum will be maintained in all four of the motor chambers 19, 20, 21 and 22.

The brakes are operated by depressing the pedal 43 to force fluid from the master cylinder 42 through the port 39 (FIGURE 1) and into the space 50 around the plunger 48. Fluid flows from the chamber 50 into the chamber 54, upon initial operation of the brake pedal, around the lip of the cup 53. This operation tends to move the brake shoes into engagement with the drums whereby a pressure will be quickly built up to operate the valve mechanism. An increase in pressure in the chamber 38 moves the plunger 72 downwardly (FIGURE 2) and the right-hand end of the lever 78 will move downwardly to close the vacuum valve 93, thus disconnecting the motor chambers 19 and 20 from the vacuum source. Further downward movement of the plunger 72 moves the left-hand end of the lever 78 (FIGURE 2) to relieve pressure against the air valve 100. Air thereupon flows into the chamber 80 and thence through pipes 105, 107, 108 and 114 into the motor chambers 19 and 20.

The pistons 16 and 17 will then start to move apart. Since the front wheel brake shoes will have been moved into, or almost into, engagement with their associated drums through the flow of fluid around the lip of the cup 53 (FIGURE 1), it will be apparent that application of braking forces by energization of the motor units will take place at the front wheels slightly before it takes place at the rear wheels. Thus it will be apparent that the system as a whole so functions that any application of the rear brakes in a passenger car ahead of the front brakes is positively prevented. This is not only important in the functioning of the system as a whole but also in the functioning of the inertia-controlled valve 118 (FIGURE 4) as described below.

Assuming that a normal brake application is performed there will be insufficient inertia generated in the body of mercury 130 to effect operation of the mercury switch as described below. The valve 118 thus will remain open and pressures in the chambers 19 and 20 will be built up equally. Application of the rear brakes is limited to hydraulic pressure in the chamber 30 generated by the piston 16, there being no pedal generated forces transmitted to the plunger 29. However, foot generated hydraulic pressures, acting behind the plungers 48 (FIGURE 1) will assist the motor piston 17 in applying the front wheel brakes. Thus much greater force will be applied to the front wheels, and this fact alone tends to prevent locking and sliding of the rear wheels.

Since braking at the rear wheels is effected solely by pressures in the motor chamber 19, there can be no increase in the rear wheel braking action after the rear end of the motor 10 is fully energized. On the other hand, braking at the front wheels will be limited solely by the ability of the operator to apply forces to the brake pedal 43. In other words, maximum front wheel braking will be determined by maximum energization of the right-hand end of the motor 10 in FIGURE 1, plus pedal-generated forces.

It will be noted that the rear end of the motor 10 (FIGURE 1) provides all the braking force necessary for applying the rear brakes under normal braking conditions. That is, if the brake pedal is not suddenly and fully depressed as in a "panic" stop, and the vehicle is traveling over an average road surface, the admission of full atmospheric pressure into the motor chamber 19 will not cause the locking of the rear wheels.

Assuming that the operator desires to make an emergency stop or at least to decelerate the vehicle very rapidly, he will exert more than the normal amount of force against the brake pedal 43. The operation previously described will take place, except that deceleration of the vehicle will occur more rapidly and when such rate reaches a predetermined point the body of mercury 130 will move forwardly and close the circuit across the contacts 131 and 132. The solenoid 120 will be energized to close the valve 118 and prevent further admission of air into the chamber 19.

The use of the bleed opening 121 is not necessary. It may be eliminated or the screw 122 closed. Thus upon the closing of the valve 118, no further air can be admitted into chamber 19 and the rear motor unit is energized below its maximum degree. Therefore hydraulic pressures transmitted to the rear wheel cylinders 32 will be limited below the maximum point and locking and sliding of the rear wheels will be prevented. However, for the reasons given above, energization of the right-hand end of the motor in FIGURE 1 will not be limited, nor will the application of pedal generated forces to the front wheel cylinders be limited. Accordingly, the front wheel cylinders cn be energized to the maximum extent, and since the pressure in the rear wheel cylinders is limited below the wheel-locking point, the vehicle may be decelerated at a higher rate. With the system described, it has been found that a vehicle traveling at high speeds can be subjected to as much as a twenty percent increase in the rate of deceleration.

It is particularly pointed out that the present system positively prevents application of the rear brakes ahead of the front brakes, and this is highly important in the functioning of the mercury switch 129 and associated elements. If this were not true, a "panic" operation of the brake pedal could lock the rear wheels before the mercury switch and associated elements would have time to function. The proper operation of the inertia responsive means, therefore, is dependent upon the positive prevention of any actuation of the rear brakes ahead of the front brakes, and it is preferred, of course, that front brake application take place first, no matter how slight such front brake application may be.

As stated, the bleed valve 121 (FIGURE 4) need not be employed. If it is, there may be a slow bleeding of air into the motor chamber 19 and pressures in such chamber will very slowly increase. However, this increase takes place as the vehicle decelerates and the rear wheels ordinarily will not lock and slide. The use of the valve 121 may be preferred on heavier vehicles.

The use of the mercury switch 128 in the particular system described is highly important. The rate of vehicle deceleration at which the mercury switch functions depends upon the inclination of this switch to the horizontal. The screw 136 is adjusted to give the mercury switch the proper angle to the horizontal to cause it to function when the vehicle is occupied only by the driver. It will be apparent that when the vehicle is more heavily loaded, the rear end of the vehicle will be somewhat lower, and this increases the angle to the horizontal of the mercury switch. This switch therefore will operate at a higher rate of vehicle deceleration. At the same time, the heavier load in the vehicle tends to prevent the rear wheels from locking and sliding, and thus the mercury switch automatically compensates for differences in the loading of the vehicle. While there is no full compensation for such loading of the vehicle, the situation is taken care of to quite an appreciable extent, and this is highly important since the rate of vehicle deceleration for a given brake application is less when a vehicle is heavily loaded than when it is lightly loaded. In other words, the rear wheels can accept a greater degree of braking in a heavily loaded vehicle without locking and sliding, and this is provided for by increasing the angle to the horizontal of the mercury switch when the vehicle is heavily loaded.

It is also pointed out that when a vehicle is descending a grade, the center of gravity of the vehicle shifts forwardly, and this fact reduces the degree of braking which can be accepted by the rear wheels without locking. In the present system, the angle of the tube 129 to the horizontal is reduced when the vehicle is descending a grade, and accordingly a lower rate of vehicle deceleration will operate the mercury switch and close off the admission of air pressure to the chamber 19. Thus automatically, when a "panic" stop is made when descending a grade, a lower degree of rear wheel braking will occur. Therefore, under the conditions described, maximum rear wheel braking applied will be held below the point at which the rear wheels will lock.

When ascending a grade, the center of gravity of the vehicle is shifted rearwardly and greater rear wheel braking can occur without locking the wheels. Under such conditions, the angle of the tube 129 to the horizontal is increased, thus increasing the rate of vehicle deceleration necessary for the closing of the mercury switch. Therefore this switch also automatically takes into account the degree of braking which can be applied to the rear wheels when ascending a grade.

Particular attention also is invited to the fact that the inertia responsive means employed in the system has no effect on the "feel" of the brake pedal, that is, the reaction transmitted to the pedal. The system is such that pedal reaction is dependent upon pressure in the line 40 which is not affected in any way by the opening or closing of the inertia responsive valve 118. Accordingly, the operator is not conscious of any functioning of the valve 118, and he retains perfect instinctive control of the brake system. The use of the mercury switch has been found to be highly advantageous in this particular system over any other type of inertia responsive means subject to vehicle deceleration, for example, the ball valve referred to above. The mercury switch is sensitive to both the degree of loading of the vehicle and any grade which the vehicle may be ascending or descending. The mercury switch is highly sensitive under all variable conditions under which it is called upon to function.

From the foregoing, it will be apparent that the present system comes as close as possible to taking the greatest advantage of the potential braking forces available to the operator without causing the rear vehicle wheels to lock. It is highly important to prevent the locking of the rear wheels since the greatest possible braking can be provided only if traction of all of the vehicle wheels on the road surface is maintained. Moreover, in conventional systems it is the instinctive tendency for a driver to ease up on the brake pedal if the rear wheels lock, in order to restore the traction of such wheels. When this is done, braking at the front wheels is momentarily reduced until force is again applied to the brake pedal. The result is that the vehicle will travel a substantially greater distance before stopping. This releasing of the brake pedal and the loss of braking forces is prevented in the present system. Moreover, the prevention of any application of the rear brakes ahead of the front brakes positively prevents the transmission of wheel locking forces to the rear wheels before the mercury switch has time to function.

The body of liquid in the line 40 and the pedal operable master cylinder constitute in effect a force transmitting link between the brake pedal and the valve mechanism and the plunger 48. It will be apparent that the present invention may be utilized in a system other than one of the type in which a pedal operated master cylinder is employed for providing the force for operating the valve mechanism and the force applied behind the plunger 48 to assist the piston 17 in applying the front wheel brakes.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism for a motor vehicle having front wheel and rear wheel brake cylinders, comprising a pair of motor devices each having a pressure responsive unit and a variable pressure chamber at one side thereof, a pair of hydraulic chambers connected by separate lines to the front and rear wheel cylinders, a plunger in each hydraulic chamber connected to one of said pressure responsive units, a single valve mechanism having communication with said variable pressure chambers and with sources of relatively low and high pressures and normally connecting said low pressure source to both variable pressure chambers, a brake pedal, means for transmitting force from said brake pedal to said valve mechanism to operate it and for transmitting force to the one of said plungers which operates the front wheel brake cylinders to assist the pressure responsive unit of the associated motor in operating such plunger, whereby force is transmitted to said last-named plunger from said pedal and from the pressure responsive unit of said associated motor while the pressure responsive unit of the other motor provides the sole force for operating its associated plunger to operate the rear wheel brake cylinders, a duct establishing said communication between said valve mechanism and the variable pressure chamber of said other motor, a normally open valve in said duct; a solenoid connected to said valve and energizable to close it, and a mercury switch including a tube extending longitudinally of the vehicle and sloping upwardly and forwardly thereof, said solenoid having a circuit including contacts at the forward end portion of said tube, and a body of mercury in said tube movable forwardly under the influence of its own inertia in response to vehicle deceleration to close said circuit across said contacts, said tube being inclined to the horizontal at a smaller angle when the vehicle is heading downhill than when it is headed uphill whereby greater inertia is required for closing said switch when the vehicle is heading uphill than when headed downhill.

2. A booster brake mechanism for a motor vehicle having front wheel and rear wheel brake cylinders, comprising a pair of motor devices each having a pressure responsive unit and a variable pressure chamber at one side thereof, a pair of hydraulic chambers connected by separate lines to the front and rear wheel cylinders, a plunger in each hydraulic chamber connected to one of said pressure responsive units, a single valve mechanism having communication with said variable pressure chambers and with sources of relatively low and high presures and normally connecting said low pressure source to both variable pressure chambers, a pedal operable master cylinder, means for conducting fluid from said master cylinder to said valve mechanism to operate it and for supplying fluid back of the one of said plungers which operates the front wheel brake cylinders to assist the pressure responsive unit of the associated motor in operating such plunger, whereby force is transmitted to said last-named plunger from said pedal and from the pressure responsive unit of said associated motor while the pressure responsive unit of the other motor provides the sole force for operating its associated plunger to operate the rear wheel brake cylinders, a duct establishing said communication between said valve mechanism and the variable pressure chamber of said other motor, a normally open valve in said duct, a solenoid connected to said valve and energizable to close it, and a mercury switch including a tube extending longitudinally of the vehicle and sloping upwardly and forwardly thereof, said solenoid having a circuit including contacts at the forward end portion of said tube, and a body of mercury in said tube movable forwardly under the influence of its own inertia in response to vehicle deceleration to close said circuit across said contacts, said tube being inclined to the horizontal at a smaller angle when the vehicle is heading downhill than when it is headed uphill whereby greater inertia is required for closing said switch when the vehicle is heading uphill than when headed downhill.

3. A booster brake mechanism for a motor vehicle having front wheel and rear wheel brake cylinders, comprising a pair of motor devices each having a pressure responsive unit and a variable pressure chamber at one side thereof, a pair of hydraulic chambers connected by separate lines to the front and rear wheel cylinders, a plunger in each hydraulic chamber connected to one of sai dpressure responsive units, a single valve mechanism having communication with said variable pressre chambers and with sources of relatively low and high pressures and normally connecting said low pressure source to both variable pressure chambers, a brake pedal, means for transmitting force from said brake pedal to said valve mechanism to operate it, such means including a fluid link for transmitting force to the one of said plungers which operates the front wheel brake cylinders to assist the pressure responsive unit of the associated motor in operating such plunger, whereby force is transmitted to said last-named plunger from said pedal and from the pressure responsive unit of said associated motor while the pressure responsive unit of the other motor provides the sole force for operating its associated plunger to operate the rear wheel brake cylinders, a duct establishing said communication between said valve mechanism and the variable pressure chamber of said other motor, a normally open valve in said duct, a solenoid connected to said valve and energizable to close it, and a mercury switch including a tube extending longitudinally of the vehicle and sloping upwardly and forwardly thereof, said solenoid having a circuit including contacts at the forward end portion of said tube, and a body of mercury in said tube movable forwardly under the influence of its own inertia in response to vehicle deceleration to close said circuit across said contacts, said tube being inclined to the horizontal at a smaller angle when the vehicle is heading downhill than when it is headed uphill whereby greater inertia is required for closing said switch when the vehicle is heading uphill than when headed downhill.

4. A booster brake mechanism for a motor vehicle having a pair of sets of wheel cylinders, comprising a hydraulic chamber connected to each set of wheel cylinders, a plunger movable into each hydraulic chamber to displace fluid therefrom, fluid pressure operated motor means comprising a pair of pressure responsive units each connected to one of said plungers and having a variable pressure chamber at the side thereof remote from the associated plunger, a single control valve mechanism, separate fluid lines communicating between said control valve mechanism and said variable pressure chambers, said valve mechanism normally connecting said fluid lines to a source of relatively low pressure and being operable for connecting such lines to a source of higher pressure, pedal operable force transmitting means for operating said valve mechanism and for simultaneously transmitting a force to the one of said plungers which operates the front wheel brake cylinders to assist the associated pressure responsive unit in operating such plunger whereby a force is transmitted to such plunger from said pedal operable means and from the associated pressure responsive unit while the other pressure responsive unit provides the sole force for operating its associated plunger to operate the rear wheel brake cylinders, a normally open valve in the fluid line leading to the variable pressure chamber associated with said other pressure responsive unit, electromagnetic means energizable for closing said valve and including a circuit, and a mercury switch extending longitudinally of the vehicle and sloping upwardly and forwardly thereof, said circuit having contacts in the forward end of said switch, and a body of mercury in said switch movable forwardly under the influence of its own inertia in response to vehicle deceleration to close said circuit across said contacts, said tube being inclined to the horizontal at a smaller angle when the vehicle is heading downhill than when it is headed uphill whereby greater inertia is required for closing said switch when the vehicle is heading uphill than when headed downhill.

5. A mechanism according to claim 4 wherein said force transmitting means includes a fluid link for transmitting said force to said one of said plungers.

6. A booster brake mechanism for a motor vehicle having a pair of sets of wheel cylinders, comprising a hydraulic chamber connected to each set of wheel cylinders, a plunger movable into each hydraulic chamber to displace fluid therefrom, fluid pressure operated motor means comprising a pair of pressure responsive units each connected to one of said plungers and having a variable pressure chamber at the side thereof remote from the associated plunger, a single control valve mechanism, separate fluid lines communicating between said control valve mechanism and said variable pressure chambers, said valve mechanism normally connecting said fluid lines to a source of relatively low pressure and being operable for connecting such lines to a source of higher pressure, a pedal operable master cylinder, means for conducting fluid from said master cylinder to said valve mechanism to operate it and for simultaneously supplying fluid back of the one of said plungers which operates the front wheel brake cylinders to assist the associated pressure responsive unit in operating such plunger whereby a force is transmitted to such plunger from said pedal operable means and from the associated pressure responsive unit while the other pressure responsive unit provides the sole force for operating its associated plunger to operate the rear wheel brake cylinders, a normally open valve in the fluid line leading to the variable pressure chamber associated with said other pressure responsive unit, electromagnetic means energizable for closing said valve and including a circuit, and a mercury switch extending longitudinally of the vehicle and sloping upwardly and forwardly thereof, said circuit having contacts in the forward end of said switch, and a body of mercury in said switch movable forwardly under the influence of its own inertia in response to vehicle deceleration to close said circuit across said contacts, said tube being inclined to the horizontal at a smaller angle when the vehicle is heading downhill than when it is headed uphill whereby greater inertia is required for closing said switch when the vehicle is heading uphill than when headed downhill.

References Cited in the file of this patent

UNITED STATES PATENTS

| | | |
|---|---|---|
| 2,182,463 | Beeston | Dec. 5, 1939 |
| 2,726,739 | Jeanson | Dec. 13, 1955 |
| 2,747,697 | Banker | May 29, 1956 |
| 2,751,575 | Jacobs et al. | June 19, 1956 |
| 2,876,044 | Hill | Mar. 3, 1959 |
| 2,903,100 | Freeman | Sept. 8, 1959 |
| 2,922,499 | Ingres | Jan. 26, 1960 |